US010850326B2

(12) United States Patent
Ashton et al.

(10) Patent No.: US 10,850,326 B2
(45) Date of Patent: Dec. 1, 2020

(54) ADDITIVE MANUFACTURING APPARATUS AND METHOD

(71) Applicant: RENISHAW PLC, Wotton-under-Edge (GB)

(72) Inventors: Ian Robert Thomas Ashton, St. Helens (GB); Stephan Kloss, Pliezhäuser Str. (DE); Christopher Sutcliffe, Liverpool (GB); Ben Ian Ferrar, Stoke-on-Trent (GB)

(73) Assignee: RENISHAW PLC, Wotton-under-Edge (GB)

( * ) Notice: Subject to any disclaimer, the term of this patent is extended or adjusted under 35 U.S.C. 154(b) by 1170 days.

(21) Appl. No.: 15/024,304

(22) PCT Filed: Sep. 23, 2014

(86) PCT No.: PCT/GB2014/052887
§ 371 (c)(1),
(2) Date: Mar. 23, 2016

(87) PCT Pub. No.: WO2015/040433
PCT Pub. Date: Mar. 26, 2015

(65) Prior Publication Data
US 2016/0236279 A1 Aug. 18, 2016

(30) Foreign Application Priority Data

Sep. 23, 2013 (GB) .................................. 1316815.8

(51) Int. Cl.
B22F 3/105 (2006.01)
G01N 21/71 (2006.01)
(Continued)

(52) U.S. Cl.
CPC .......... B22F 3/1055 (2013.01); B29C 64/153 (2017.08); B29C 64/268 (2017.08);
(Continued)

(58) Field of Classification Search
CPC ....... B22F 3/1055; B33Y 30/00; B33Y 10/00; G01N 2201/06113; B29C 64/20
See application file for complete search history.

(56) References Cited

U.S. PATENT DOCUMENTS 5,427,733 A 6/1995 Benda et al.
6,580,959 B1 6/2003 Mazumder
(Continued)

FOREIGN PATENT DOCUMENTS

CN 103167946 A 6/2013
EP 1815936 A1 8/2007
(Continued)

OTHER PUBLICATIONS

Mar. 12, 2018 Office Action issued in Chinese Patent Application No. 201480063855.7.
(Continued)

Primary Examiner — Colleen P Dunn
Assistant Examiner — Jeremy C Jones
(74) Attorney, Agent, or Firm — Oliff PLC

(57) ABSTRACT

This invention concerns a laser solidification apparatus for building objects by layerwise solidification of powder material. The apparatus including a build chamber containing a build platform, a device for depositing layers of powder material on to the build platform, an optical unit for directing a laser beam to selectively solidify areas of each powder layer and a spectrometer for detecting characteristic radiation emitted by plasma formed during solidification of the powder by the laser beam. The invention also relates to a spectrometer for detecting characteristic radiation generated by interaction of the metal with the or a further laser beam. The spectra recorded using the spectrometer may be used for feedback control during the solidification process.

14 Claims, 15 Drawing Sheets

(51) Int. Cl.
*G01N 21/27* (2006.01)
*G01J 3/28* (2006.01)
*B29C 64/153* (2017.01)
*B29C 64/268* (2017.01)
*B33Y 10/00* (2015.01)
*B33Y 30/00* (2015.01)
*B33Y 50/02* (2015.01)

(52) U.S. Cl.
CPC ............. *G01J 3/28* (2013.01); *G01N 21/274* (2013.01); *G01N 21/718* (2013.01); *B22F 2003/1057* (2013.01); *B33Y 10/00* (2014.12); *B33Y 30/00* (2014.12); *B33Y 50/02* (2014.12); *G01N 2201/06113* (2013.01); *Y02P 10/295* (2015.11)

(56) References Cited

U.S. PATENT DOCUMENTS

| | | | |
|---|---|---|---|
| 2004/0094728 | A1 | 5/2004 | Herzog et al. |
| 2007/0153644 | A1* | 7/2007 | Corrain ............ G02B 7/28 369/44.13 |
| 2007/0176312 | A1 | 8/2007 | Clark et al. |
| 2009/0016924 | A1 | 1/2009 | Allen et al. |
| 2009/0152771 | A1 | 6/2009 | Philippi et al. |
| 2009/0206065 | A1 | 8/2009 | Kruth et al. |
| 2010/0233012 | A1* | 9/2010 | Higashi ............ B22F 3/1055 419/9 |
| 2011/0039016 | A1 | 2/2011 | Beard |
| 2013/0112672 | A1 | 5/2013 | Keremes et al. |
| 2013/0154160 | A1 | 6/2013 | Cooper |
| 2013/0168902 | A1 | 7/2013 | Herzog et al. |
| 2013/0270746 | A1 | 10/2013 | Elsey |
| 2016/0136730 | A1* | 5/2016 | McMurtry ......... G02B 26/02 425/162 |

FOREIGN PATENT DOCUMENTS

| | | | |
|---|---|---|---|
| EP | 1987910 | A1 | 11/2008 |
| EP | 2147738 | A1 | 1/2010 |
| EP | 2598313 | B1 | 6/2013 |
| SE | 520709 | C2 | 8/2003 |
| WO | 95/11100 | A1 | 4/1995 |
| WO | 00/00921 | A1 | 1/2000 |
| WO | 2007/147221 | A1 | 12/2007 |
| WO | 2007/147222 | A2 | 12/2007 |
| WO | 2009/112799 | A2 | 9/2009 |
| WO | 2010/007396 | A1 | 1/2010 |
| WO | 2010/026397 | A1 | 3/2010 |

OTHER PUBLICATIONS

Kruth, J-P. et al., "Feedback control of Selective Laser Melting," Katholieke Universiteit Leuven, Department of Mechanical Engineering, Division PMA, Belgium, pp. 1-7.

Clusters, S. et al, "In situ quality control of the selective laser melting process using a high-speed, real-time melt pool monitoring system," Internationl Journal of Advanced Manufacturing Technology, (2014), pp. 1089-1101.

Mazumder, Jyoti et al., "Advances in Direct Metal Deposition," A Laser Workshop on "Laser Based Manufacturing," Center for Laser Aided Intelligent Manufactuing, University of Michigan.

Chivel, Yu et al., "On-ling temperature monitoring in selective laser sintering/melting," Physics Procedia, vol. 5, (2010), pp. 515-521.

Doubenskaia, Maria et al., "Optical System for On-Line Monitoring and Temperature Control in Selective Laser Melting Technology," Key Engineering Materials, vol. 437, (2010), pp. 458-461.

Sackett, P. J. et al., "A review of data visualisation: opportunities in manufacturing sequence management," Internationl Journal of Computer Integrated Manufaturing, vol. 19, No. 7, (Oct. 2006), pp. 689-704.

Nair, Vijay et al., "Statistics in Advanced Manufacturing," Journal of the American Statistical Association, vol. 95, No. 451, (2000), pp. 1002-1005.

Mar. 11, 2015 Search Report issued in International Patent Application No. PCT/GB2014/052887.

Feb. 13, 2014 Search Report issued in British Patent Application No. 1316815.8.

Mar. 11, 2015 Written Opinion issued in International Patent Application No. PCT/GB2014/052887.

Dec. 29, 2016 Office Action issued in Chinese Patent Application No. 201480063855.7.

* cited by examiner

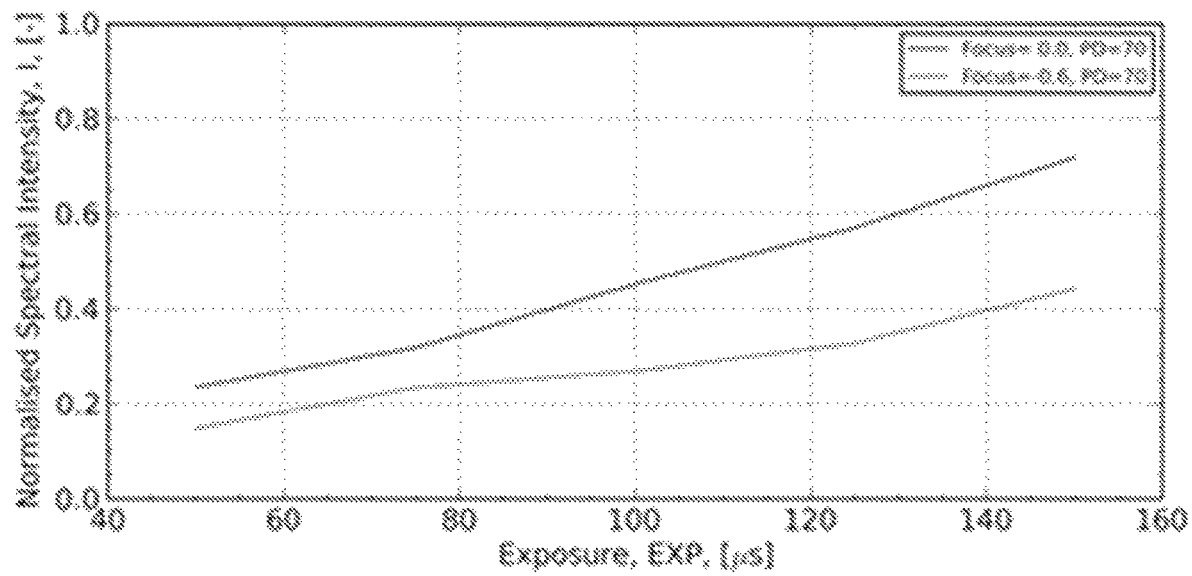
Spectral intensity for varying exposure length   Fig. 8a
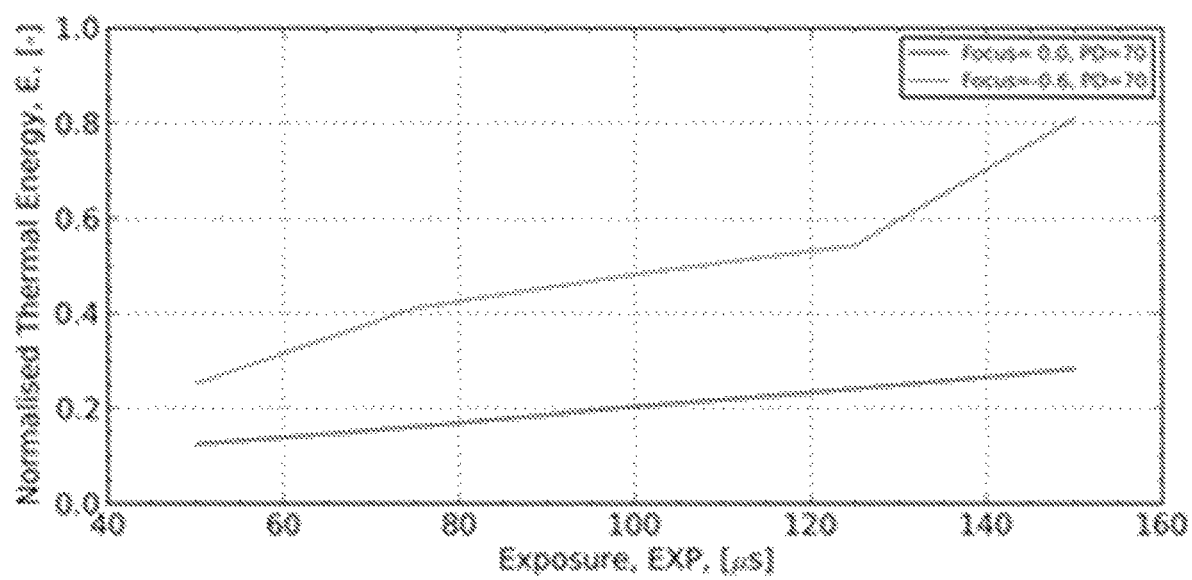
Thermal energy emitted for varying exposure length   Fig. 8b

ADDITIVE MANUFACTURING APPARATUS AND METHOD

FIELD OF INVENTION

This invention concerns additive manufacturing apparatus and methods and has particular, but not exclusive application, to providing monitoring and in-process control of a selective laser solidification process, such as selective laser melting (SLM) or selective laser sintering (SLS).

BACKGROUND

Additive manufacturing or rapid prototyping methods for producing objects comprise layer-by-layer solidification of a material, such as a metal powder material, using a high energy beam, such as a laser beam. A powder layer is deposited on a powder bed in a build chamber and a laser beam is scanned across portions of the powder layer that correspond to a cross-section of the object being constructed. The laser beam melts or sinters the powder to form a solidified layer. After selective solidification of a layer, the powder bed is lowered by a thickness of the newly solidified layer and a further layer of powder is spread over the surface and solidified, as required.

It is known to monitor and control the selective laser powder process in response to monitored parameters. For example, WO2007/147221 discloses apparatus for collecting laser light reflected from the powder bed using elements of the optical train that are used to deliver the laser beam. The laser is delivered to the powder bed and radiation reflected by the powder bed is collected by scanning optics comprising a pair of movable mirrors and an f-O lens. A semi-reflective mirror reflects the laser light towards the scanning optics but allows the reflected radiation to pass therethrough to a camera and photodetector. A similar system is disclosed in WO95/11100 but the beam splitter is provided between the scanning mirrors and a lens for focussing the laser light.

US2007/0176312A1 discloses the use of Raman spectroscopy in direct laser deposition, which allows analysis for organic and/or ceramic constituents. WO2009/112799A2 discloses a device for applying layers of a strong Raman scatterer product and a Raman spectrometer device for monitoring the frequency of light scattered from an area of the material whilst the laser used to melt the material is applied to that area. However, such a technique does not work with metal powder layers because such metal layers do not produce Raman spectra. Raman spectroscopy relies on scattering of light from a sample.

SUMMARY ON INVENTION

According to a first aspect of the invention there is provided a laser solidification apparatus for building objects by layerwise solidification of powder material, the apparatus comprising a build chamber containing a build platform, a device for depositing layers of powder material on to the build platform, an optical unit for directing a laser beam to selectively solidify areas of each powder layer and a spectrometer for detecting characteristic radiation emitted by plasma formed during solidification of the powder by the laser beam.

The apparatus may be used to determine a characteristic of the material in the layer from a spectrum detected during solidification. Such an apparatus may be particularly useful for determining characteristics of the solidification process, especially when the material being solidified is one that does not generate any or a strong Raman spectrum, such as a metal. These characteristics may be used for validating an object built using the apparatus and/or to provide in-process control.

According to a second aspect of the invention there is provided a laser solidification apparatus for building objects by layerwise solidification of metal powder, the apparatus comprising a build chamber containing a build platform, a device for depositing layers of metal powder on to the build platform, an optical unit for directing a laser beam to selectively solidify areas of each metal powder layer and a spectrometer for detecting characteristic radiation generated by interaction of the metal with the or a further laser beam.

The spectrometer may be arranged for detecting a spectrum/spectra emitted by the material during solidification, for example, when the material is melted. The emission may be stimulated through exposure of the material to the laser, which melts the material. In this way, it may be possible to determine from the detected spectrum information on the solidification process, such as the melt pool generated using the laser. For example, it may be possible to determine from the spectrum/spectra information on a temperature, diameter and/or depth of a melt pool generated by the laser. It may also be possible to determine the chemical composition of the material in the melt pool. In particular, if the powder material is a mixture of different materials, different characteristics of the different materials may result in the melt pool containing different amounts of each material to that contained in the powder material, for example because of different melting temperatures. It may be possible to determine a property of the plasma, such as temperature of the plasma. A temperature of the plasma may indicate whether or not that the solidification process is proceeding as desired.

The spectrometer may be for detecting characteristic radiation generated by creating a melt pool with the laser (so called laser induced plasma spectroscopy). The characteristic radiation may be radiation emitted by plasma emitted from the melt pool.

The apparatus may comprise a control unit for controlling the optical unit and/or a laser based upon a detected spectrum/detected spectra. The control unit may be arranged to alter point distance, exposure time, scan speed, hatch spacing, laser power and focussing of the laser based upon the detected spectrum/detected spectra.

The apparatus may comprise a validation unit for storing a log of spectra detected for different locations on each layer.

The spectrometer may be arranged for detecting characteristic radiation collected by the optical unit. The optical unit may comprise an optical scanner for steering the laser beam to the desired point on a powder layer, the spectrometer arranged to detect characteristic radiation that is collected through the optical scanner. The optical scanner may comprise movable focussing optics for focussing the laser beam on the powder layer, the spectrometer arranged to detect characteristic radiation that is collected through the focussing optics. The optical scanner may be arranged such that the characteristic radiation collected by the optical scanner travels along a path shared with the laser beam and comprises a beam splitter for dividing the optical paths of the laser beam and the radiation to direct the radiation onto a detector of the spectrometer. The beam splitter may be located upstream, relative to a direction of travel of the laser beam, of steerable optics for steering the laser beam and movable focussing optics for focussing the laser beam. The beam splitter may be arranged to reflect the laser beam and transmit the characteristic radiation.

According to a third aspect of the invention there is provided a laser solidification apparatus for building objects by layerwise solidification of powder material, the apparatus comprising a build chamber containing a build platform, a device for depositing layers of powder material on to the build platform, an optical unit for directing a laser beam to selectively solidify areas of each powder layer and a spectrometer arranged for detecting characteristic radiation generated by interaction of the material in the layer with the or a further laser beam that is collected by the optical unit.

According to a fourth aspect of the invention there is provided an optical unit for directing a laser beam to selectively solidify areas of powder layers in a selective laser solidification apparatus, the optical unit comprising a spectrometer arranged for detecting characteristic radiation, generated by interaction of the material in the layer with the or a further laser beam, that is collected by the optical unit.

According to a fifth aspect of the invention there is provided a laser solidification apparatus for building objects by layerwise solidification of powder material, the apparatus comprising a build chamber containing a build platform, a device for depositing layers of powder material on to the build platform, an optical unit for directing a laser beam to selectively solidify areas of each powder layer, the optical unit comprising steerable optics for steering the laser beam onto the powder layer and movable focussing optics for focussing the laser beam, and a photodetector arranged for detecting characteristic radiation, generated by interaction of material in the layer with the or a further laser beam, that is collected by the steerable optics and movable focussing optics.

According to a sixth aspect of the invention there is provided an optical unit for directing a laser beam to selectively solidify areas of powder layers in a selective laser solidification apparatus, the optical unit comprising steerable optics for steering the laser beam onto the powder layer and movable focussing optics for focussing the laser beam, and a photodetector arranged for detecting characteristic radiation, generated by interaction of material in the layer with the or a further laser beam, that is collected by the steerable optics and movable focussing optics.

According to a seventh aspect of the invention there is provided a process of selective laser solidification comprising depositing layers of powder material on to the build platform and directing a laser beam to selectively solidify areas of each powder layer to build an object, the method further comprising detecting a characteristic of the laser solidification process by spectroscopically analysing radiation emitted by plasma formed during solidification of the powder by the laser beam.

According to an eighth aspect of the invention there is provided a process of selective laser solidification comprising depositing layers of metal powder on to the build platform and directing a laser beam to selectively solidify areas of each metal powder layer to build an object, the method further comprising detecting a characteristic of the laser solidification process by spectroscopically analysing radiation generated by interaction of the metal with the or a further laser beam.

The characteristic of the laser solidification process may be a temperature, diameter and/or depth of a melt pool generated by the laser. The characteristic of the laser solidification process may be an offset of a focus of the laser beam from a plane of the powder layer.

The spectroscopic analysis may comprise identifying a portion of the spectrum that is a result of thermal emission from the melt pool. The analysis may comprise identifying a portion of the spectrum that at least approximates blackbody radiation.

A temperature of the melt pool may be determined from the portion of the spectrum that is identified as relating to thermal emission/blackbody radiation.

The spectroscopic analysis may comprise determining an offset of the focus from a plane of the powder layer from a peak intensity of a portion of the spectrum identified as relating to thermal emissions/blackbody radiation. The spectroscopic analysis may comprise determining an offset of the focus from a plane of the powder layer from an intensity of portions of the spectrum identified as spectral emission from plasma emitted from the melt pool.

The method may comprise adjusting the laser solidification process based upon the spectroscopic analysis. The method may comprise adjusting point distance, exposure time, scan speed, hatch spacing, laser power and/or focussing of the laser based upon the spectroscopic analysis. An excess in energy density vaporising the melt pool may be identified from an intensity of the spectral emissions. The point distance, exposure time, scan speed, hatch distance and/or laser power may be altered to alter the energy density.

The method may comprise identifying a spectral peak of the spectrum and comparing a relative intensity of the spectral peak to another spectral peak of the spectrum and/or a portion of the spectrum identified as relating to thermal emissions for the plasma and/or melt pool. The spectral peaks may correspond to spectral lines of a single material of the powder. For example, if the powder is an alloy, then both spectral peaks correspond to spectral lines generated by the same chemical element of the alloy.

According to a ninth aspect of the invention there is provided a method of calibrating a selective laser solidification apparatus comprising a build chamber containing a build platform, a device for depositing layers of powder material on to the build platform, an optical unit for directing a laser beam to selectively solidify areas of each powder layer and a camera arranged for imaging the build platform through the optical unit along an optical path common with the laser beam such that the relative location of the image and focus of the laser beam are fixed, the method comprising locating in the build chamber a calibrated artefact, the calibrated artefact having a series of calibration marks thereon, operating the optical module to direct the laser beam to a location on the calibrated artefact, activating the laser to form a laser mark on the calibrated artefact, using the camera to capture an image of the calibrated artefact with the laser mark thereon and determining an offset of the focus of the laser beam from a desired position by comparing a location of the laser mark in the image to a location of at least one of the calibration marks in the image.

The optical module may be operated to be in a configuration programmed for directing the laser beam onto a specified one of the calibration marks on the calibrated artefact, for example by centring the specified calibration mark in an image captured by the camera, activating the laser to form a laser mark on the calibration artefact, using the camera to capture the image of the calibrated artefact with the laser mark thereon and determining the offset of the focus of the laser beam from the desired position by comparing a location of the laser mark in the image to a location of the specified calibration mark. The optical module may be then be updated to alter the programmed configuration(s) for directing the laser beam based on the determined offset.

Updating of the configurations may be based on multiple laser marks and comparisons of these laser marks to corresponding calibration marks.

The calibrated artefact may be calibrated to the extent that the calibrated marks are located at known relative locations on the calibrated artefact. For example, the calibrated marks may be a grid of lines having a known spacing in perpendicular directions.

According to a tenth aspect of the invention there is provided a data carrier having instructions thereon, which, when executed by a processor of a selective laser solidification apparatus, causes the selective laser solidification apparatus to carry out the process of the sixth or seventh aspect of the invention.

According to a eleventh aspect of the invention there is provided a laser solidification apparatus for building objects by layerwise solidification of powder material, the apparatus comprising a build chamber containing a build platform, a device for depositing layers of powder material on to the build platform, an optical unit for directing a laser beam to selectively solidify areas of each powder layer, a device for projecting a light pattern onto each powder layer and a camera for capturing images of the light pattern on each powder layer.

The captured images may be used to determine a geometric property of an object being built using the solidification process. For example, the geometric property may be determined from the locations of the light pattern on the powder layer. The captured images may be used to create measured geometric data representing the object built using the selective laser solidification process. The measured geometric data may be compared to input geometric data, such as an STL file, on which the build was based to identify differences between the actual object built and the object that was intended to be built.

The processing of the images to determine a geometric property of the object and/or to create measured geometric data may be carried out by a processor of the selective laser solidification apparatus or by a processor separate from the selective laser solidification apparatus.

According to a twelfth aspect of the invention there is provided a method of measuring an object built using a selective laser solidification process, wherein an object is built by depositing layers of powder material on to the build platform and directing a laser beam to selectively solidify areas of each powder layer to build an object, the method comprising after selectively solidifying areas of at least one of the powder layers, projecting a light pattern on to the powder layer and capturing an image of the projected light.

The light pattern may be a fringe/diffraction pattern.

According to a thirteenth aspect of the invention there is provided a data carrier having instructions stored thereon, wherein the instructions, when executed by a processor, cause the processor to receive at least one image of a powder layer having areas that have been solidified by a selective solidification process and onto which a pattern of light is projected, determining a geometry of solidified areas of each powder layer from the pattern of light on the powder layer, comparing the measured geometry to input geometric data, such as an STL file, on which the build is based to identify differences between the actual object built and the object that was intended to be built.

According to a fourteenth aspect of the invention there is provided a laser solidification apparatus for building objects by layerwise solidification of powder material, the apparatus comprising a build chamber containing a build platform, a device for depositing layers of powder material on to the build platform, an optical unit for directing a laser beam to selectively solidify areas of each powder layer, a camera for capturing images of each powder layer and an analysis unit for analysing the images to identify solidified areas of the powder layer.

According to a fifteenth aspect of the invention a laser solidification apparatus for building objects by layerwise solidification of powder material, the apparatus comprising a build chamber containing a build platform, a device for depositing layers of powder material on to the build platform, an optical unit for directing a laser beam to selectively solidify areas of each powder layer and a photodetector for detecting characteristic radiation generated by stimulated emission of material in the layer, the photodetector arranged to detect wavelengths within a wavelength band including a wavelength of a characteristic spectral peak of the characteristic radiation.

The wavelength band may consist of wavelengths less than 700 nm. Preferably, the wavelength band is between 300 and 600 nm. For alloys comprising cobalt chrome, the characteristic peak may be a peak around 360 nm, 430 nm or 520 nm and preferably 430 nm. For titanium aluminium alloys, the characteristic peak may be a peak around 360 nm, 400 nm, 500 nm or 520 nm and preferably 500 nm.

The photodetector may comprise a photodiode. The photodetector may comprise a bandpass (notch) filter. The bandpass filter may be for filtering wavelength of light above 700 nm and preferably has a bandwidth of or within 300 nm to 600 nm.

The apparatus may comprise a control unit for controlling the laser unit based upon a light intensity detected by the photodetector. The control unit may be arranged to alter point distance, exposure time, scan speed, hatch spacing, laser power and focussing of the laser based upon the detected light intensity.

According to a sixteenth aspect of the invention there is provided an optical unit for directing a laser beam to selectively solidify areas of powder layers in a selective laser solidification apparatus, the optical unit comprising an input for the laser beam, a mirror movable to change an angle of incidence of the laser beam to the mirror for directing the laser beam to selected areas of each powder layer, the mirror having, across an operable range of the angles of incidence, a reflectivity of greater than 80% for both a wavelength of the laser beam and wavelengths between 300 and 600 nm.

Shifting of the reflectivity of the mirror to be sufficiently reflective at wavelengths between 300 nm to 600 nm allows the mirror to be used to collect radiation emitted by a plasma formed through interaction of the laser beam with the powder material that is characteristic of the material that is present. This reflected radiation can then be separated from a path of the laser beam, for example by an optical splitter, and delivered to a detector, such as a spectrometer for analysing the radiation.

The mirror may comprise a multi-layer dielectric coating to provide the reflective performance.

According to a seventeenth aspect of the invention there is provided an additive manufacturing apparatus comprising an optical unit according to the sixteenth aspect of the invention, a laser for generating a laser beam directed into the input of the optical unit and a detector arranged to receive radiation reflected by the mirror of the optical unit.

The laser may further generate an alignment laser beam, the alignment laser beam directed to the input of the optical unit, the alignment laser beam having a wavelength outside of the range 300 nm to 600 nm. For example, the alignment laser may have a wavelength between 630 nm to 680 nm. The mirror may have less than 80% reflectivity for the wavelength of the alignment laser beam. In additive manufacturing apparatus low reflectivity for the alignment laser beam may be sufficient for alignment purposes.

DESCRIPTION OF THE DRAWINGS

FIGS. 8a to 8d illustrate changes in thermal and spectral emissions with changes in exposure time and point distance;

FIG. 11b is a cross-sectional view of the calibration artefact along the line A-A shown in FIG. 10a.

DESCRIPTION OF EMBODIMENTS

Figure 1:
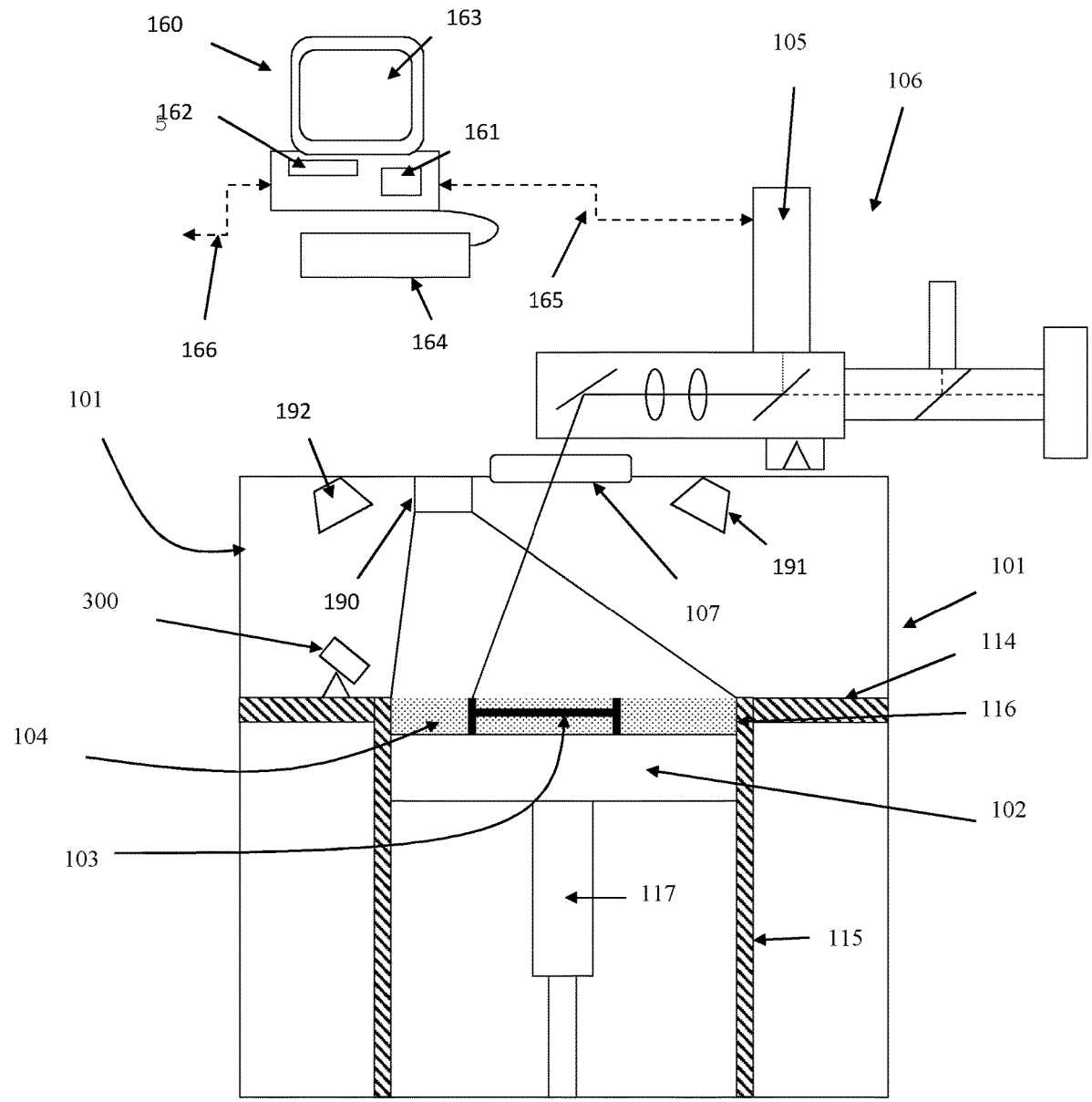
FIG. 1 is a schematic representation of a selective laser melting (SLM) apparatus according to the invention.
Figure 2A:
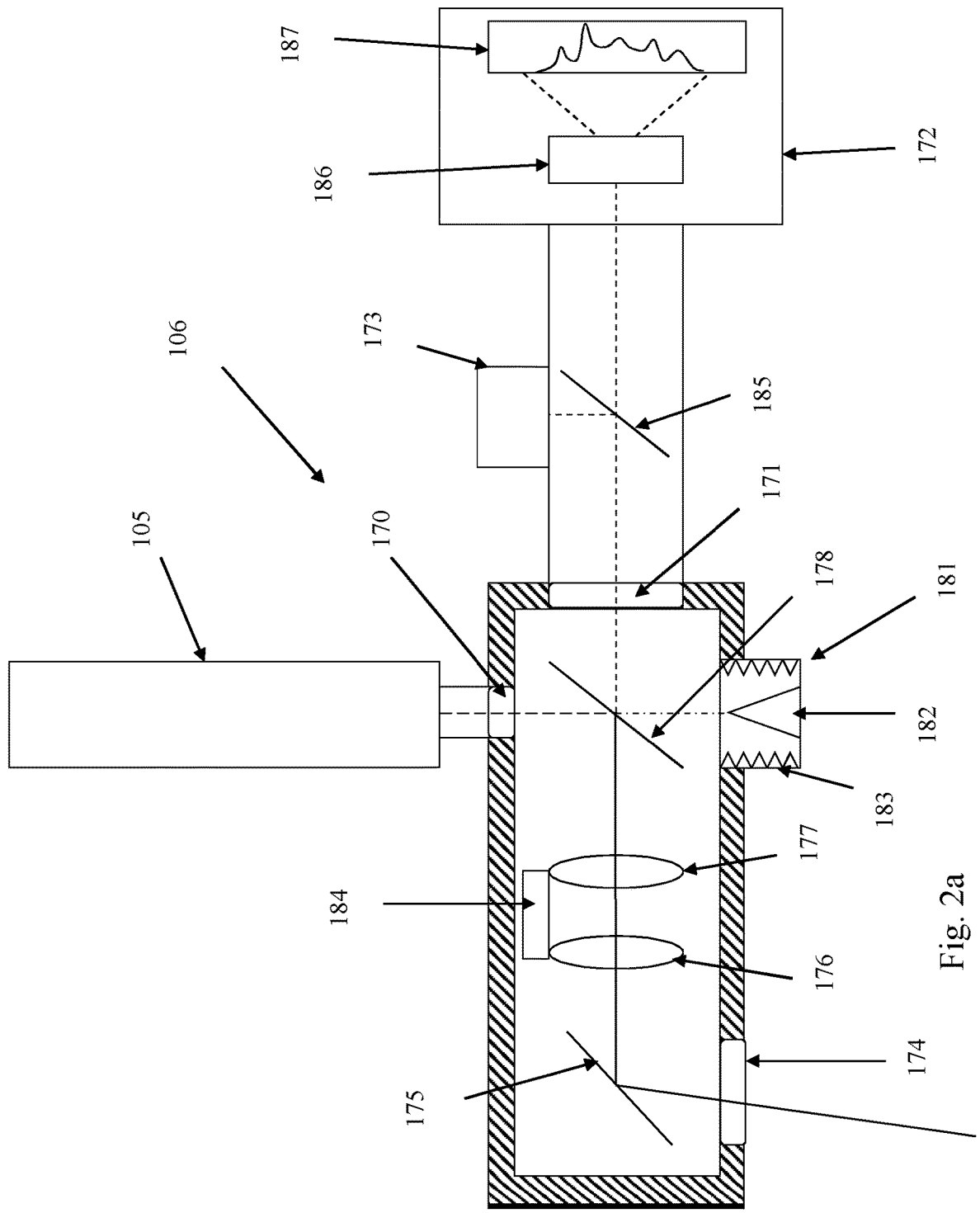
FIG. 2a is a schematic representation of an optical unit according to the invention.

Referring to FIGS. 1 and 2, a selective laser melting (SLM) apparatus according to an embodiment of the invention comprises a build chamber 101 having therein partitions 114, 115 that define a build volume 116 and a surface onto which powder can be deposited. A build platform 102 defines a working area in which an object 103 is built by selective laser melting powder 104. The platform 102 can be lowered within the build volume 116 using mechanism 117 as successive layers of the object 103 are formed. A build volume available is defined by the extent to which the build platform 102 can be lowered into the build volume 116. Layers of powder 104 are formed as the object 103 is built by dispensing apparatus and a wiper (not shown). For example, the dispensing apparatus may be apparatus as described in WO2010/007396. A laser module 105 generates a laser for melting the powder 104, the laser directed onto the powder bed 104 as required by optical module 106 under the control of a computer 160. The laser enters the chamber 101 via a window 107.

Computer 160 comprises a processor unit 161, memory 162, display 163, user input device 164, such as a keyboard, touch screen, etc, a data connection to modules of the laser melting apparatus, such as optical module 106, laser module 105 and motors (not shown) that drive movement of the dispensing apparatus, wiper and build platform 102. An external data connection 166 provides for the uploading of scanning instructions to the computer 160. The laser unit 105, optical unit 106 and movement of build platform 102 are controlled by the computer 160 based upon the scanning instructions.

FIG. 2 shows the optical module 106 in detail. The optical module comprises a laser aperture 170 for coupling to the laser module 105, a measurement aperture 171 for coupling to measurement devices 172, 173 and output aperture 174 through which the laser beam is directed through window 107 on to the powder bed 104 and radiation emitted from the powder bed is collected.

The laser beam is steering and focussed to the required location on the powder bed 104 by scanning optics comprising two tiltable mirrors 175 (only one of which is shown) and focussing lenses 176, 177.

The tiltable mirrors 175 are each mounted for rotation about an axis under the control of an actuator, such as galvanometer. The axes about which the mirrors 175 are rotated are substantially perpendicular such that one mirror can deflect the laser beam in one direction (X-direction) and the other mirror can deflect the laser beam in a perpendicular direction (Y-direction). However, it will be understood that other arrangements could be used, such as a single mirror rotatable about two axes and/or the laser beam could be coupled, for example via an optical fibre, into a mirror mounted for linear movement in the X- and Y-directions. Examples of this latter arrangement are disclosed in US2004/0094728 and US2013/0112672.

In order to ensure that a focus of the laser beam is maintained in the same plane for changes in a deflection angle of the laser beam it is known to provide an f-θ lens after tiltable mirrors. However, in this embodiment, a pair of movable lenses 176, 177 are provided before (relative to the direction of travel of the laser beam) the tiltable mirrors 175 for focussing the laser beam as the deflection angle changes. Movement of the focussing lenses 176, 177 is controlled synchronously with movement of the tiltable mirrors 175. The focussing lenses 176, 177 may be movable towards and away from each other in a linear direction by an actuator, such as a voice coil 184.

Figure 2B:
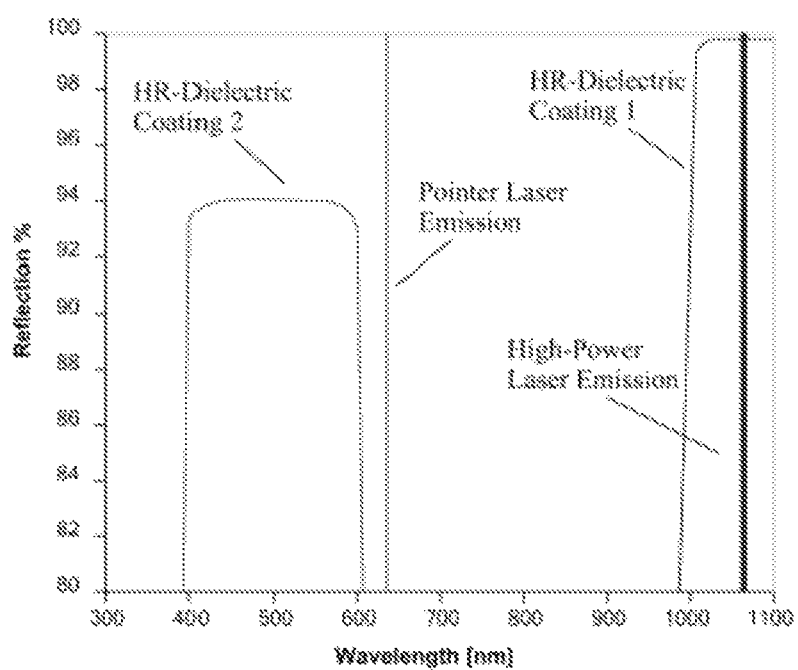
FIG. 2b is a graph showing the desired reflectivity profile of the mirrors.

The tiltable mirrors 175 and focussing lenses 176, 177 are selected appropriately to transmit both the laser wavelength, which is typically 1064 nm, and wavelengths of the collected radiation that contain characteristic spectral peaks of the material being processed, described in more detail below. The characteristic spectral peaks tend to be at wavelengths of less than 700 nm and usually between 300 and 600 nm. In one embodiment, the mirrors 175 comprise a silver coating and the lenses 176, 177 are fused silica. In another embodiment, the mirrors 175 comprise a multi-layer dielectric coating that reflects the laser wavelength with a reflectivity of greater than 99% and preferably, greater than 99.5%, and wavelengths of identified spectral peaks of the radiation emitted from the plasma that can be used for analysis, typically, wavelengths between 400 and 600 nm, with a reflectivity of greater than 80% for angles of incidence of between 30 to 60 degrees. FIG. 2b shows a typical reflectivity profile for the mirrors for these angles of incidence. As can be seen an alignment (pointing) laser used for aligning the main laser beam has a wavelength for which the mirrors are less than 80% reflective. The coatings may be $SiO_2$, $TiO_2$, $Al_2O_3$, $Ta_2O_5$ or fluorides such as $MgF_2$, $LaF_3$ and $AlF_3$.

A beam splitter 178 is provided between the focussing lenses 176, 177 and the laser 105 and measuring devices 172, 173. The beam splitter 178 is a notch filter that reflects light of the laser wavelength but allows light of other wavelengths to pass therethrough. Laser light is reflected towards the focussing lenses 176, 177 and light that is collected by the scanning optics that is not of the laser wavelength is transmitted to measuring aperture 171. Reflection of the laser light is preferred over transmission because of the potential for astigmatic artefacts to be introduced into the laser beam from transmission through the beam splitter 178. The beam splitter 178 is selected to have a sufficiently low absorption for the laser wavelength, such as less than 1% and preferably less than 0.1% of the laser intensity. For a 200 Watt laser such a low absorption may maintain heating of the beam splitter 178 to less than a set temperature above ambient temperature, such as less than 6° C. above ambient. The notch filter is capable of reflecting all polarisations of light, i.e. both s- and p-polarised light, as the laser light is not polarised.

The optical module 106 further comprises a heat dump 181 for capturing laser light that is transmitted through the beam splitter 178. The majority of the laser light is, as intended, reflected by the beam splitter 178. However, a very small proportion of the laser light passes through the beam splitter 178 and this small proportion of laser light is captured by the heat dump 181. In this embodiment, the heat dump 181 comprises a central cone 182 that reflects light onto a scattering surface 183 located on the walls of the heat dump 181. The scattering surface 183 may be a surface having a corrugated or ridged surface that disperses the laser light. For example, the scattering surface 183 may comprise a ridge having a helix or spiral shape. The scattering surface may be made from anodised aluminium.

Various measuring devices can be connected to the measuring aperture 171. In this embodiment, a spectrometer 172 and a camera 173 are provided for measuring the radiation collected by the optical scanner. A further beam splitter 185 splits the radiation deflected into aperture 171 to direct a proportion of the radiation to spectrometer 172 and a proportion to camera 173.

The spectrometer 172 provides a measurement of the spectrum of light emitted from the area of the powder bed 104 that is exposed to the laser beam and camera 180 captures an image of this region. The spectrometer 172 comprises processing optics 186 that spatially separates the light based on wavelength. To do this, the processing optics will typically comprise a dispersive element such as a diffraction grating. The processing optics 186 may comprise other optical elements, such as further filters for filtering out certain wavelengths of light, such as light of the laser wavelength. The spectrum is dispersed onto a photodetector 187, such as a CCD camera or CMOS camera.

Other measuring devices may be used in addition to and instead of the spectrometer 172 and camera 173. For example, one or more photodiodes arranged for detecting light within a narrow band of wavelengths may be provided. Such photodiodes may provide a cheaper and faster way of measuring the intensity of light within the narrow band than a spectrometer. For example, it may be desirable to monitor the intensity of two or more particular spectral peaks and this may be achieved using photodiodes arranged for detecting wavelengths in a narrow band around the spectral peaks.

In use, the computer 160 controls the laser 105 and the optical module 106 to scan the laser beam across areas of the powder layer to solidify selected areas based upon geometric data stored on the computer 160. Melting of the powder layer stimulates the material to generate thermal radiation. Some of the material will also be vaporised to form plasma. The plasma emits spectral radiation having a characteristic spectrum based on the materials present. Both thermal radiation and spectral radiation is collected by the optical module 106 and directed towards the measuring devices 172, 173.

The detected spectrum and image are sent to computer 160, wherein the data is stored. Such data can then be used for later validation of the object built using the process. The detected spectrum and/or image can also be analysed by the computer 160 and, based on the analysis, the computer 160 may change the parameters of during the build.

Figure 3:
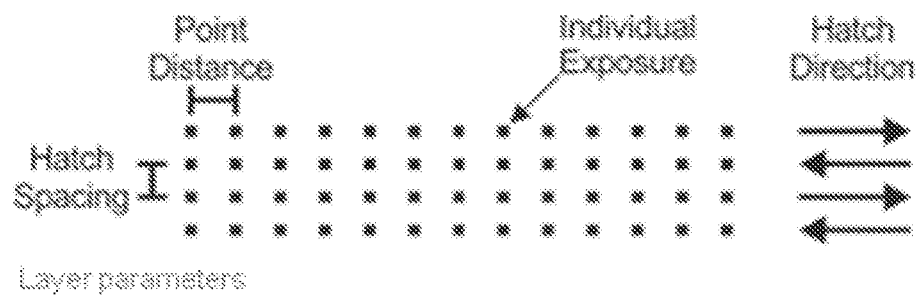
FIG. 3 shows the point scanning strategy used by the SLM apparatus.

FIG. 3 is a schematic illustrating various parameters of the build process that may be changed. In this embodiment, the laser beam is "scanned" across a surface of the powder bed in a series of discrete points, with the mirrors being stationary whilst a point is exposed to the laser beam and laser beam being switched off when the mirrors 175 are moved to direct the laser beam to the next point. Typically, the points are scanned in lines, each line being called a hatch, and to scan an area of the powder bed it is usually necessary to use a number of adjacent hatches. Accordingly, the scan parameters that can be changed comprise the time each point is exposed to the laser beam (exposure time), time delay between exposures of adjacent points, the distance between points (point distance), laser spot size (which will be governed by a location to which the laser beam is focussed (the offset of the focus from the surface of the powder layer)), distance between hatches (hatch spacing) and laser power.

Other scanning strategies can be used with different parameters. For example, the laser beam could be continuously scanned across the powder layer and rather than setting exposure time, time delay between exposures and point distance, one would set scan speed.

Figure 4:
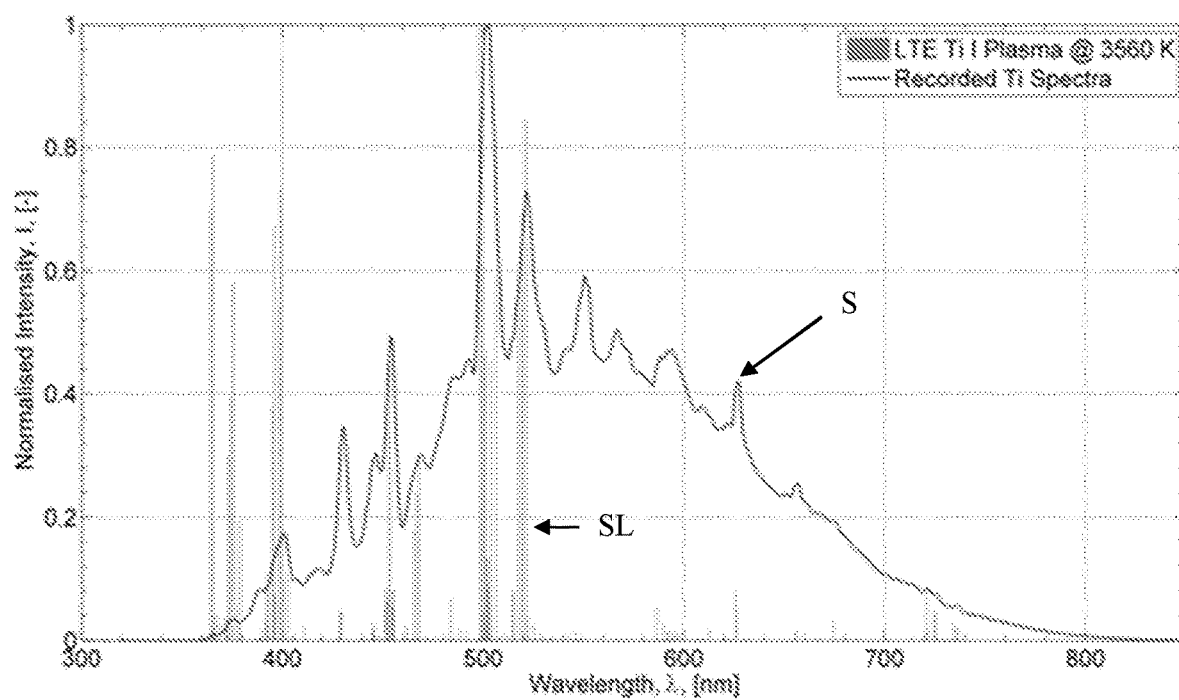
FIG. 4 is a graph showing a spectrum measured during melting of titanium powder using an SLM apparatus and the spectral peaks that are expected for titanium plasma at 3560K.

FIG. 4 illustrates a typical spectrum, S, that may be detected by the spectrometer 172. This spectrum, S, was obtained when melting titanium in a selective laser melting process. The spikes, SL, correspond to the spectral lines that would be expected for titanium. As can be seen the spectrum, S, comprises peaks that correspond to these spectral lines, SL. The cut-off below 370 nm resulted from the collecting optics having a cut-off at 370 nm.

Figure 5:
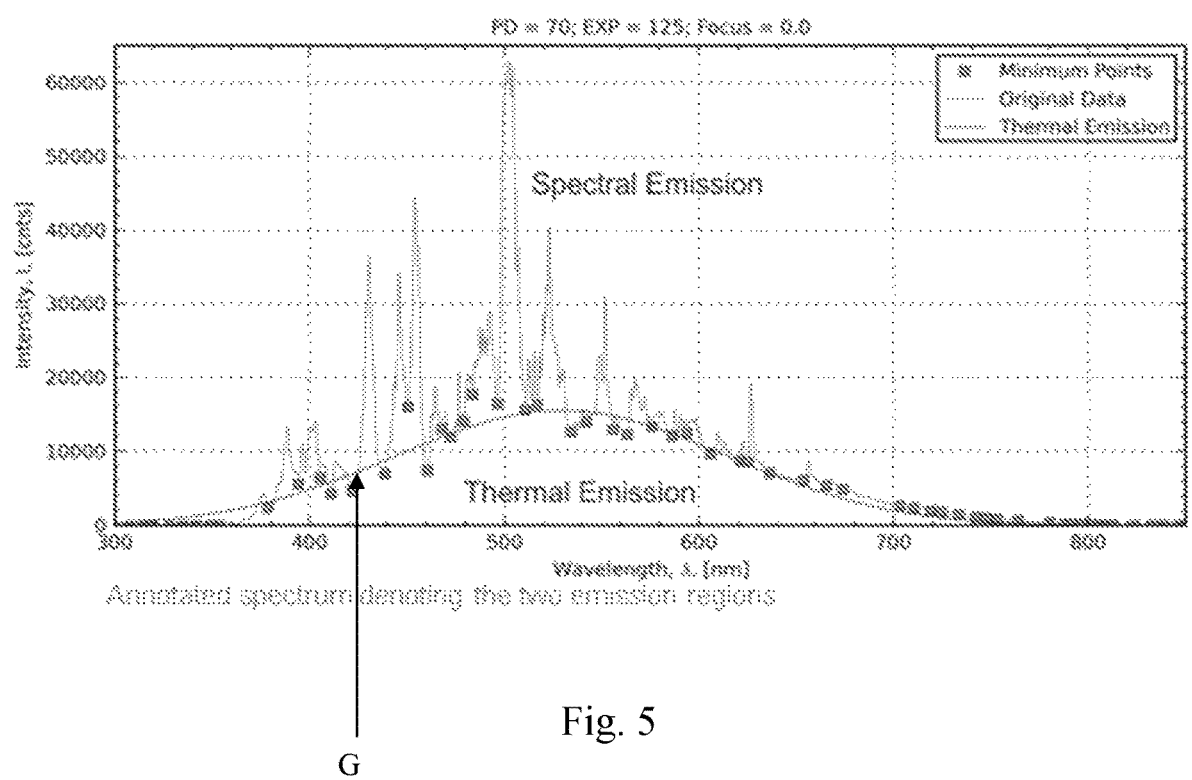
FIG. 5 shows a spectrum measured during melting of titanium powder using an SLM apparatus in which the thermal and spectral emissions are identified.

FIG. 5 shows a spectrum for titanium having a point distance of 70 microns, an exposure time of 125 microseconds and a focus offset of 0 (i.e. the focus is located at the powder bed). The spectrum is made up of two regions, a thermal emission region resulting from blackbody radiation emitted by the melted powder material and vaporised material and spectral emission region (comprising the peaks corresponding to the spectral lines for the material) generated from the vaporised material.

The spectrum can be processed, for example using computer 160, to separate the thermal emission from the spectral emission. For example, the thermal emission may be estimated by fitting a curve, such as a Gaussian curve, to the spectrum, as shown by curve G in FIG. 5. By modelling the thermal emissions characteristics of the material, such as modelling the material as a blackbody radiator, the fitted curve can be used to estimate the temperature of the melt pool and/or plasma.

The peaks in the spectral emission region may be used to determine a chemical composition of the melted powder. For example, the spectral peaks may be analysed to determine if the powder material has become contaminated. For alloys, wherein a powder comprising a mixture of materials is provided, an amount of each material in the vaporised plasma may be estimated from an intensity of the spectral peaks, from which could be inferred the percentage of material in the solidified areas. For example, each material in the powder may vaporise to different extents under different melt conditions, such as different temperatures and pressures. The material that remains is solidified to form the object. Accordingly, changes in the melt conditions can change the resultant proportions of the materials that form the object. By monitoring the spectral peaks during building of the object, the parameters may be changed to ensure that the required proportions of each material are obtained in the solidified material.

Figure 6A:
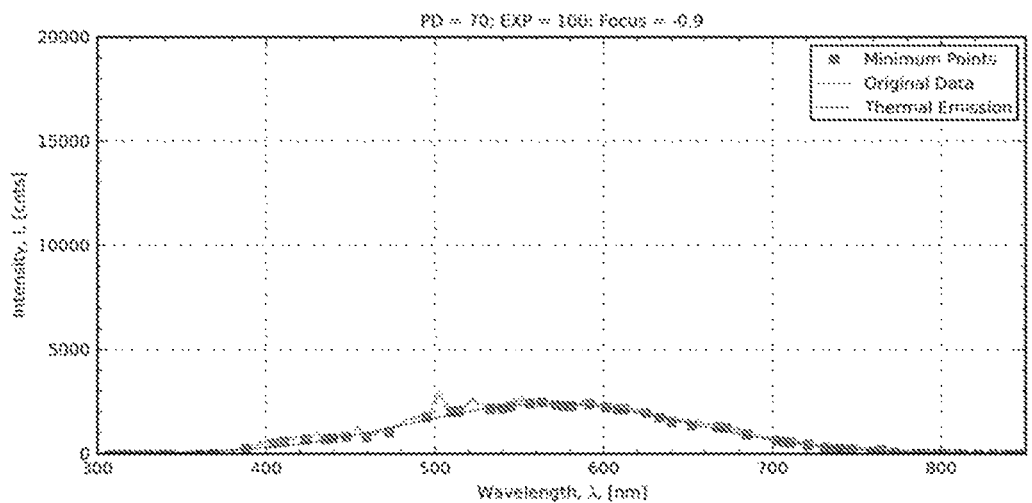
FIGS. 6a to 6f illustrate changes in thermal emission and spectral emission for changes in spot diameter of the laser beam.
Figure 6B:
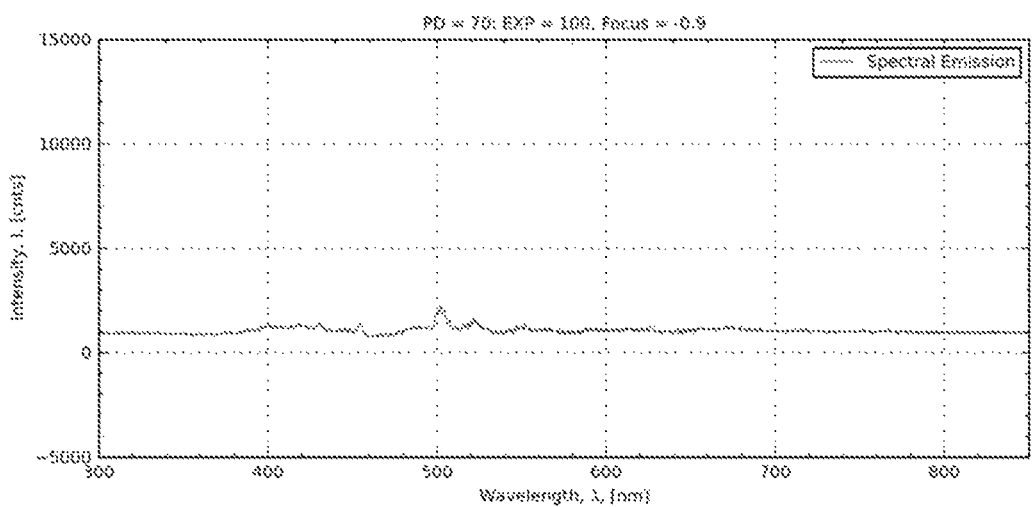
Figure 6C:
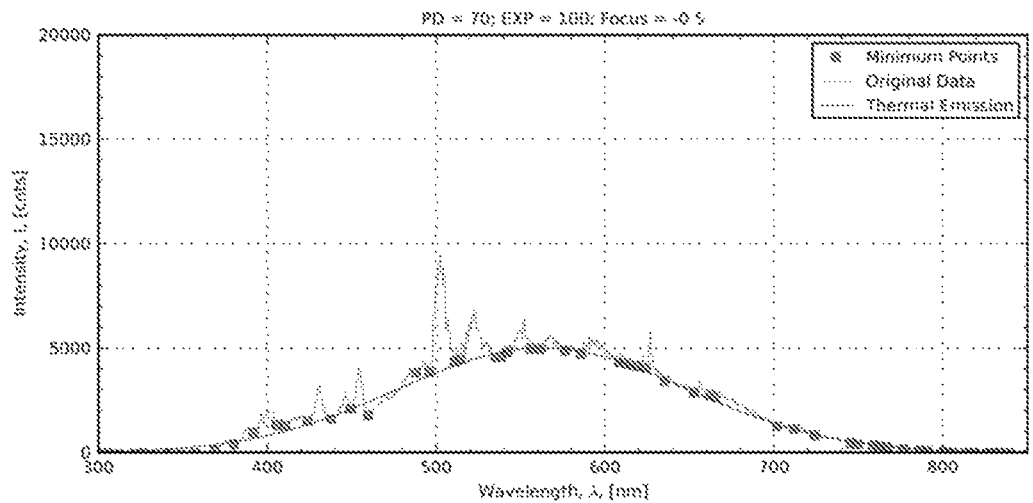
Figure 6D:
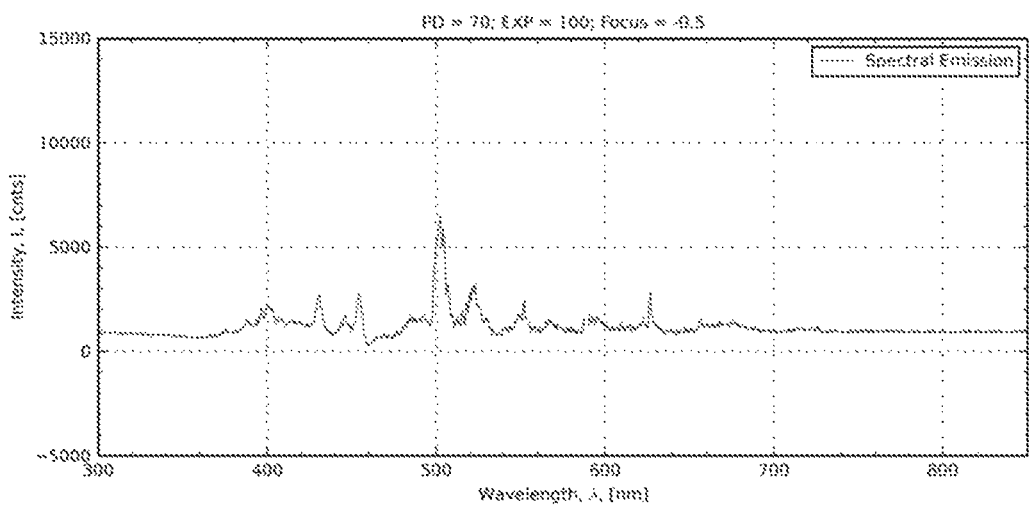
Figure 6E:
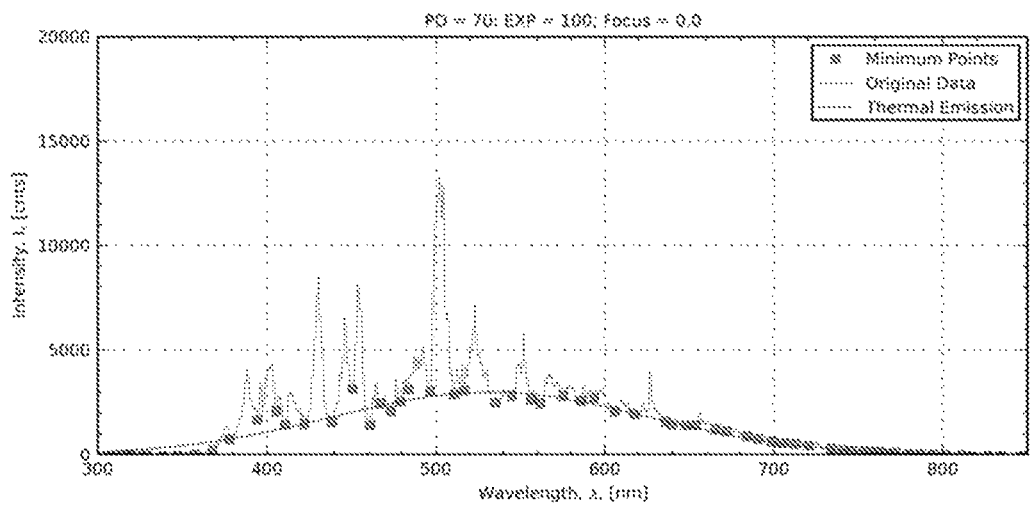
Figure 6F:
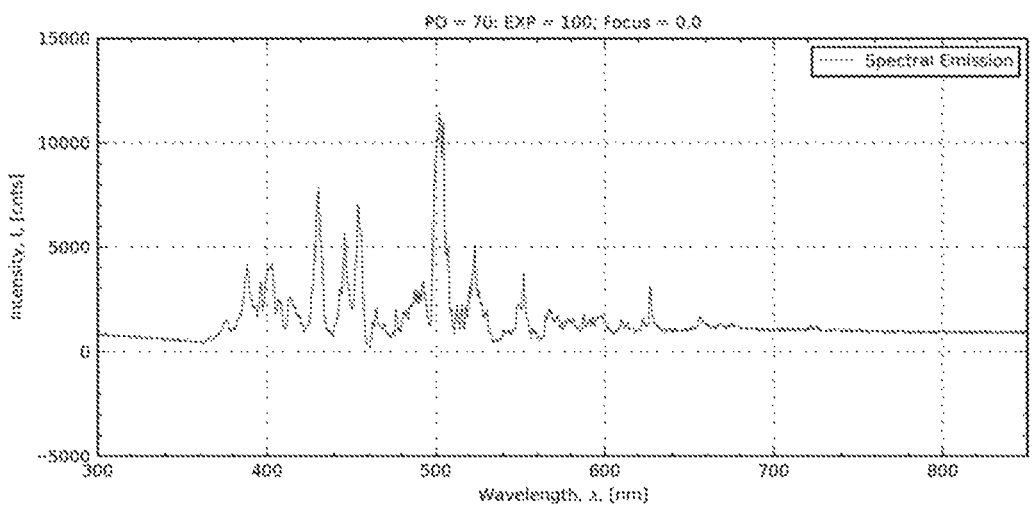

FIGS. 6a to 6f show different intensities for the thermal emission and spectral emission for different focus offsets. For FIGS. 6a and 6b the focus offset is −0.9 mm (i.e. 0.9 mm below the surface of the powder bed 104), for FIGS. 6c and 6d, −0.5 mm and for FIGS. 6e and 6f, the focus offset is 0 mm, i.e. at the surface of the powder bed 104. In these experiments, the point distance is 70 microns and the exposure time is 100 microseconds. FIGS. 6a, 6c an 6e show the full spectrum with a curve fitted to the spectrum to model the thermal emissions and FIGS. 6b, 6d and 6f show the spectral emissions once the thermal region has been removed based upon the fit. The beam diameter at the surface of the powder bed 104 increases as the focal point is moved to a location below the powder bed. For FIGS. 6a and 6b the beam diameter is 84 micrometres, for FIGS. 6c and 6d the beam diameter is 70 micrometres and for FIGS. 6e and 6f the beam diameter is 52 micrometres.

As can be seen from FIGS. 6a to 6f, the thermal emissions are higher for a focus offset of −0.5 mm and the spectral emissions are higher at a focus offset of 0 mm. It is believed that a large thermal region denotes good energy coupling of the laser beam into the melt pool, whereas a larger spectral region denotes greater vaporisation of the powder material.

The aim of the selective laser melting process is to use the energy of the laser beam to melt the powder and vaporising material with the laser beam is wasting the energy of the laser beam and creates condensate that could affect the accuracy of the build, for example by solidifying on other areas of the powder material or by contaminating the window 107 through which the laser beam is projected in the chamber 101. Accordingly, the desire is to control the parameters of the laser scan to achieve a melt pool having a sufficient temperature to ensure that a melt pool of the required size is generated, whilst vaporisation of the powder is minimised.

Figure 7:
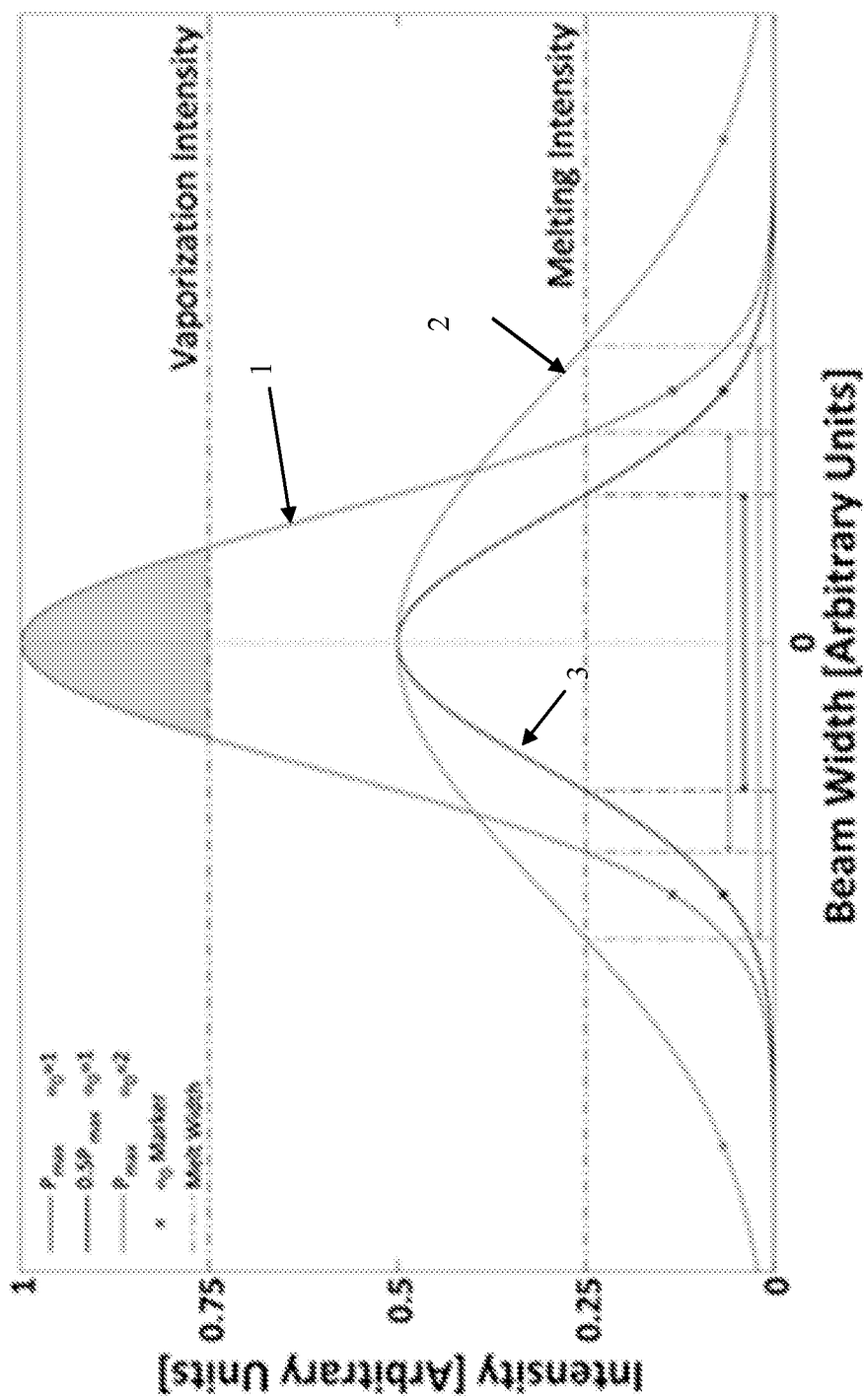
FIG. 7 is a graph illustrating the effects of changing beam diameter and beam intensity.
Figure 8C:
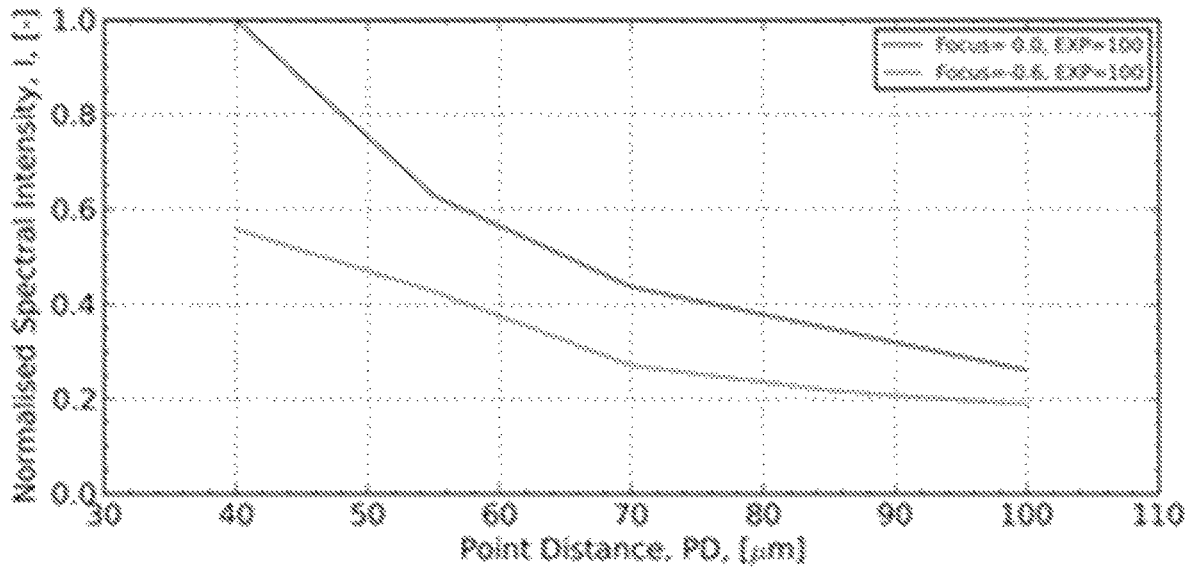
Figure 8D:
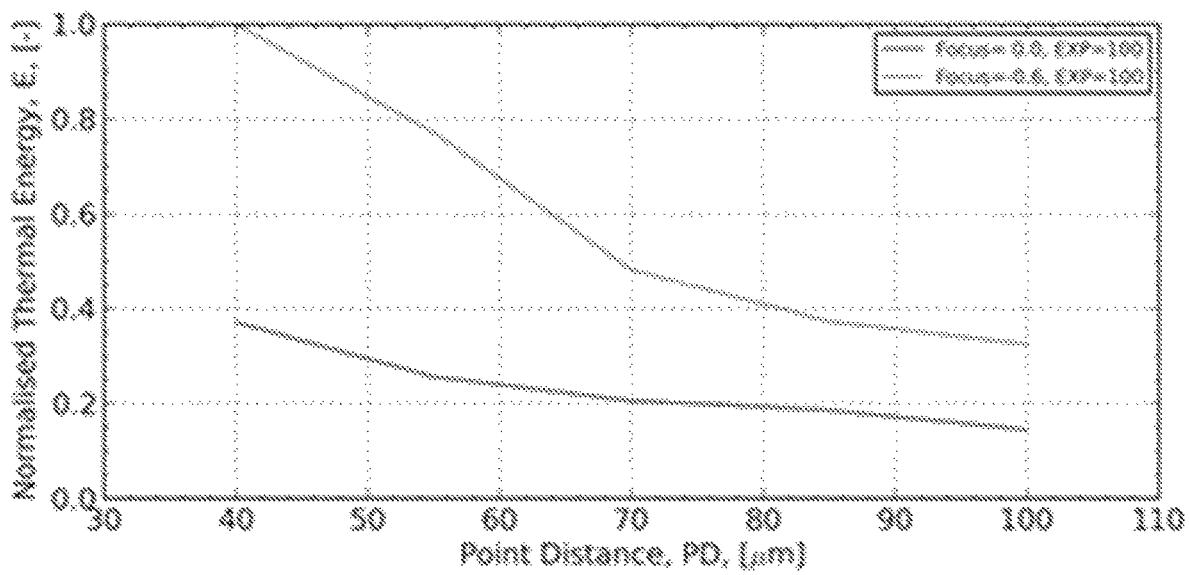

FIG. 7 illustrates theoretical Gaussian beam profiles and how the beam profile can affect the proportion of material that is vaporised and the diameter of the beam across which melting of the powder is achieved (so called "melt width"). In this example, beam profiles 1 and 3 are for the laser beam at the maximum power but with profile 2 having twice the width (beam diameter) as profile 1 (the width determined as the $1/e^2$ width), whereas beam profile 2 is for the laser beam at half the maximum power but with the same beam diameter as profile 1. As can be seen, profile 1 provides for sufficient beam intensity to vaporise the powder material, with profiles 1 and 3 providing different melt widths (indicated by the double ended arrows). A shallower gradient to the beam profile, such as in profile 2, may increase the amount of sintering of material that occurs at an edge of the melt pool. It may be desirable to reduce the amount of sintering as the edge of a melt pool to a minimum, although the amount of sintering that is acceptable may depend on the region of the object that is being formed. For example, if a central region of the object is being formed, then powder regions adjacent to the point being melted may be melted in subsequent steps such that sintering within these regions is not a concern. However, for edges of the object, it may be desirable to avoid sintering of adjacent powder regions.

The intensity at which powder is vaporised and melted may vary depending upon the state of material surrounding the point being melted. For example, if the area of powder is above a solidified area, heat flow to the solidified area is higher than if the area is above powder because the solidified area acts as a heat sink taking energy away from the melt zone. Accordingly, equal energy into an area without underlying solidified material may result in a larger melt pool. It may be possible to determine the extent to which energy is coupled and maintained in the area being melted from the thermal emission spectrum.

By combining analysis of the thermal emission and spectral emission, the computer 160 may be able to control the scan parameters to control vaporisation of the powder and the size and temperature of the melt pool. For example, the temperature of the melt pool may be determined from the intensity of the spectral emission region.

Whether or not the beam is focussed on a surface of the powder layer may be determined by comparing a value for the peak intensity of the spectral emissions divided by the peak intensity if the thermal emissions to expected values determined from a calibration process.

Figure 9A:
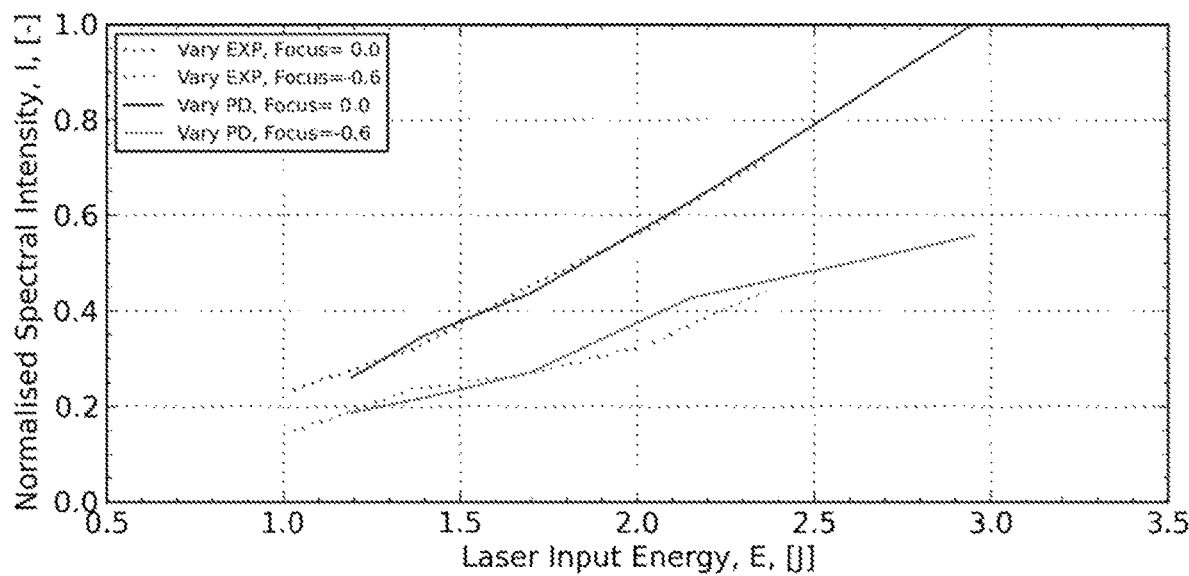
FIGS. 9a and 9b illustrate changes in spectral emissions and thermal emissions with laser input energy.
Figure 9B:
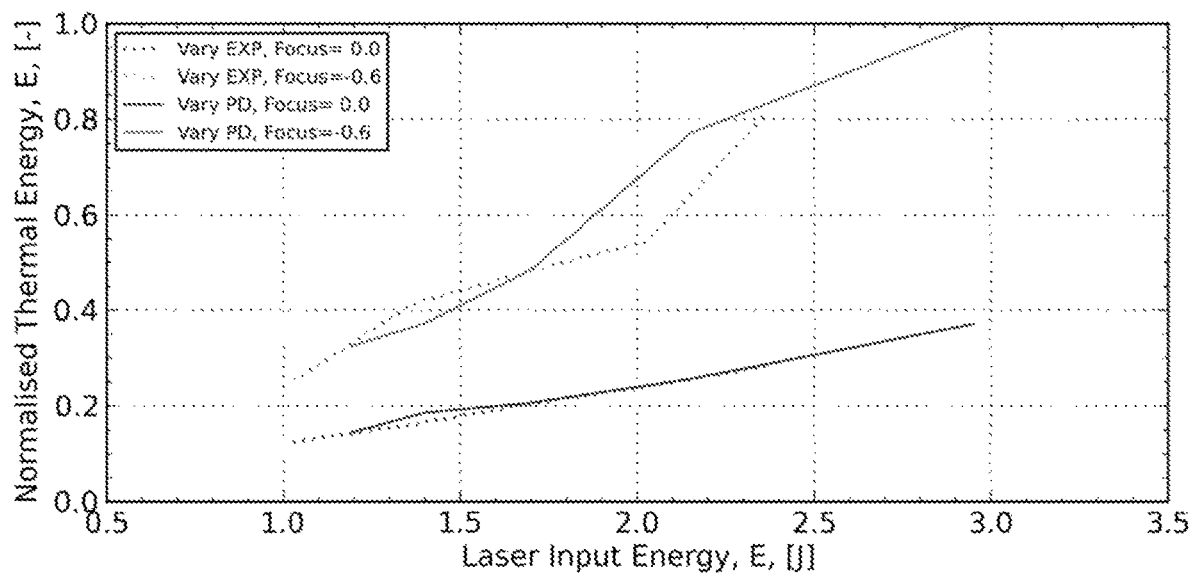

FIGS. 8a to 8d show changes in the thermal emission and spectral emissions with changes in exposure and point distance. FIGS. 9a and 9b show, respectively, changes in spectral intensity for changes in exposure time and point distance plotted as the laser energy input verses spectral intensity and FIG. 9b is the corresponding graph for thermal emissions. These results suggest that for a given laser energy input, the spectral and thermal emissions are the same. This suggests that longer exposures do not result in higher thermal and spectral emissions if the point distance is changed in a corresponding manner to maintain the same laser input energy. Such a relationship may be used by computer 160 to control the laser parameters based on the measured spectrum/spectra.

The depth of the melt pool may be estimated from the spectrum, such as from the thermal and/or spectral emissions.

Figure 10:
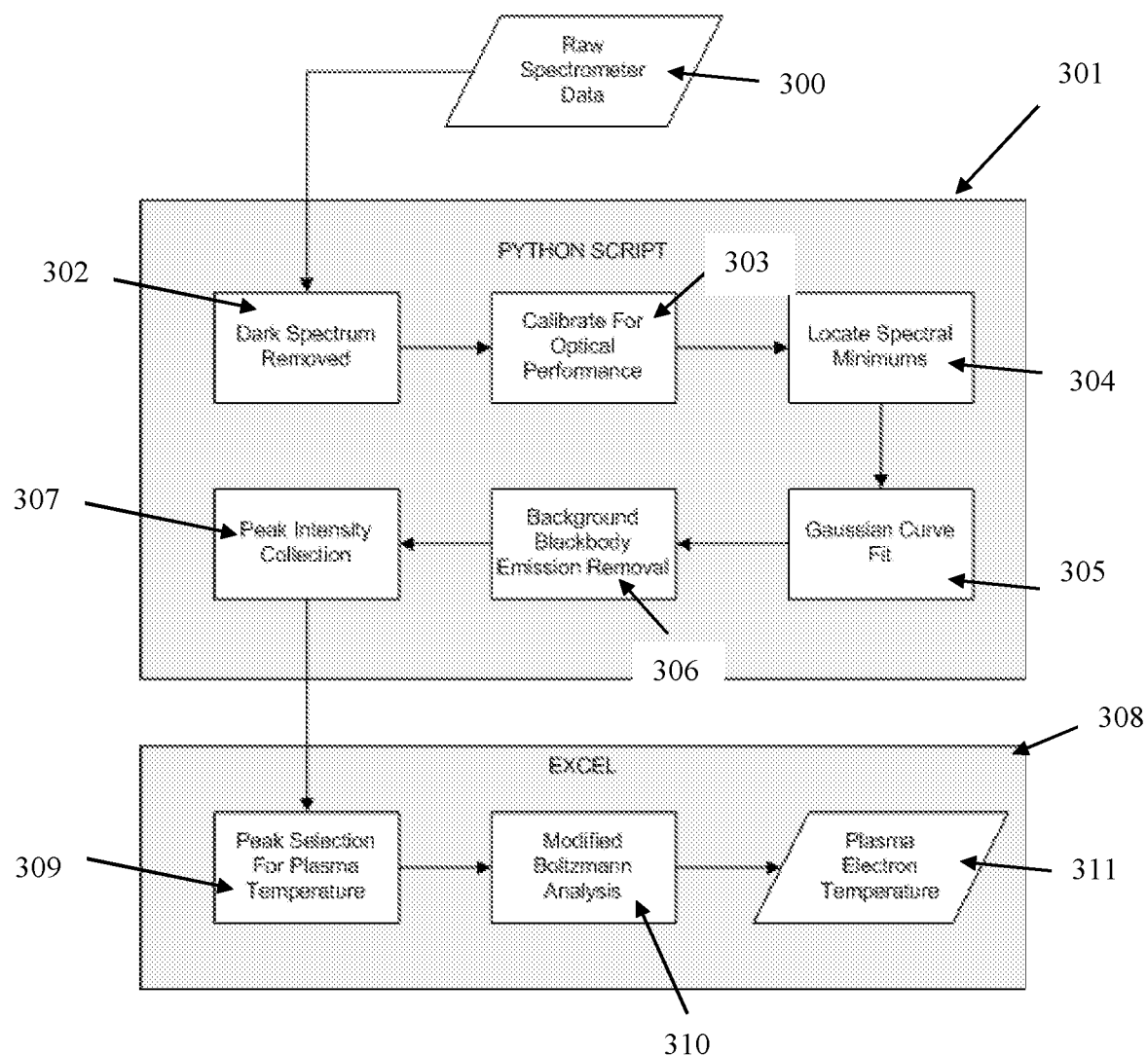
FIG. 10 is a flowchart illustrating a method according to one embodiment of the invention.

Referring to FIG. 10, a method of analysing the spectrum obtained from the plasma according to another embodiment of the invention is shown. A raw spectrum is received 300 from the spectrometer and the spectrum processed 301 to isolate the spectral peaks generated by electron excitations in the plasma. First the dark spectrum (the spectrum generated by the spectrometer without a light source) is removed 302 and the spectrum adjusted 303 for a pre-calibrated performance of the spectrometer. An estimate of the background radiation is then made from the spectral data and this estimated background removed. In this embodiment, the background radiation is estimated by identifying 304 the spectral minima and fitting 305 a Gaussian curve the identified minima. The estimated background radiation is then removed 306 from the spectrum. The spectral peaks are then identified and the intensities of the spectral peaks determined 307.

An analysis is then carried out on the spectral peaks to determine 308 a temperature of the plasma.

Each spectral peak relates to an electron excitation state in the plasma. The relative intensities of the spectral peaks are dependent on temperature of the plasma. Accordingly, by comparing the relative intensities of selected peaks an estimate of the temperature of the plasma can be made. The temperature of the plasma may correlate with the temperature of the melt pool, the parameters being used for scanning, such as focal length, and the build quality. In one embodiment, an ideal temperature of the plasma may be pre-identified for a build and the scan parameters adjusted based on the temperature measured from the spectral data.

In this embodiment, the peak selection 309 for plasma temperature analysis may be made based on the ease with which the peaks can be resolved (for example, depending on the spectral range of the spectrometer, some peaks may lie within a single pixel of a CCD of the spectrometer) and the transition probabilities for the electron potentials that generate the peaks and the difference in excitation energy for the electron potentials.

A temperature of the plasma can be determined 309. In this embodiment from the intensities of the selected peaks m,n using the following Boltzmann relation:

$$T_e = -\frac{E_m - E_n}{k_b \ln\left[\frac{E_n I_m \lambda_m A_n g_n}{E_m I_n \lambda_n A_m g_m}\right]}$$

$T_e$=Plasma Electron Temperature.
$E_m$=Electron Energy=Energy of an electron in the mth quantum level.
$I_m$=Emission Intensity=Collective intensity of all electrons transitioned to the mth level.
$\lambda_m$=Wavelength=Wavelength of photon emitted by a transition from ground state to the mth level.
$A_m$=Transition Probability=Probability of an electron transition to mth level.
$g_m$=Statistical Weight=A weighting based upon a number of allowed quantum mechanical states of level m.
$E_m$=Electron Energy=Energy of an electron in the nth quantum level.
$I_m$=Emission Intensity=Collective intensity of all electrons transitioned to the nth level.
$\lambda_m$=Wavelength=Wavelength of photon emitted by a transition from ground state to the nth level.
$A_m$=Transition Probability=Probability of an electron transition to nth level.
$g_m$=Statistical Weight=A weighting based upon a number of allowed quantum mechanical states of level n
$k_b$=Boltzmann's constant.

In another embodiment, rather than comparing the intensities of two spectral peaks to estimate a temperature of the plasma, a relative intensity between one spectral peak and the background radiation may be compared.

It is believed that the plasma temperature closely correlates with a position of the focus of the laser beam relative to an upper surface of the powder bed and adjustments may be made to the focal position based upon the measurements of plasma temperature.

No visible spectrum/spectral peaks or a reduction in intensity below a set level may indicate build failure. For example, a spectrum may not be generated when the part has curled up during the build such that the laser heats solidified material that now projects above the powder surface rather than the powder. A plasma plume may not be generated when the laser heats the solidified material.

The data stored on the spectra recorded by the spectrometer may be sent, via link 166, to a separate, external computer in which a validation of the build may be carried out by analysing the data. The external computer may comprise a computer program for automatically analysing the spectroscopy data to ensure that the values fall within acceptable ranges.

FIG. 1 also shows a projector 190 for projecting a pattern of light, such as a diffraction pattern, onto the working area, in this embodiment, the entire working area. Cameras 191, 192 are arranged to capture images of the entire working area, including the light pattern, and these images are sent back to computer 160. The projector 190 and cameras 191, 192 are arranged to capture images of the working area after each powder layer has been scanned with the laser beam. From analysis of the image, areas of the powder layer that were solidified can be identified. From the identified areas, a 3D model of the object being built can be created. Geometrical properties of the object being built can be determined from this 3D model and these geometrical properties compared to a nominal value for the geometric property derived from a design drawing, such as a CAD model or STL model of the object to determine whether the object has been built to be within the required tolerances. This analysis can thus be further used to validate the build.

Alternatively, the determination of the geometry of the object being built may be carried out without the projected diffraction pattern. For example, the solidified areas of the powder may be determined from the two images captured by the cameras 191, 192, or even a single image from one camera 191, 192, using photogrammetry.

Figure 11A:
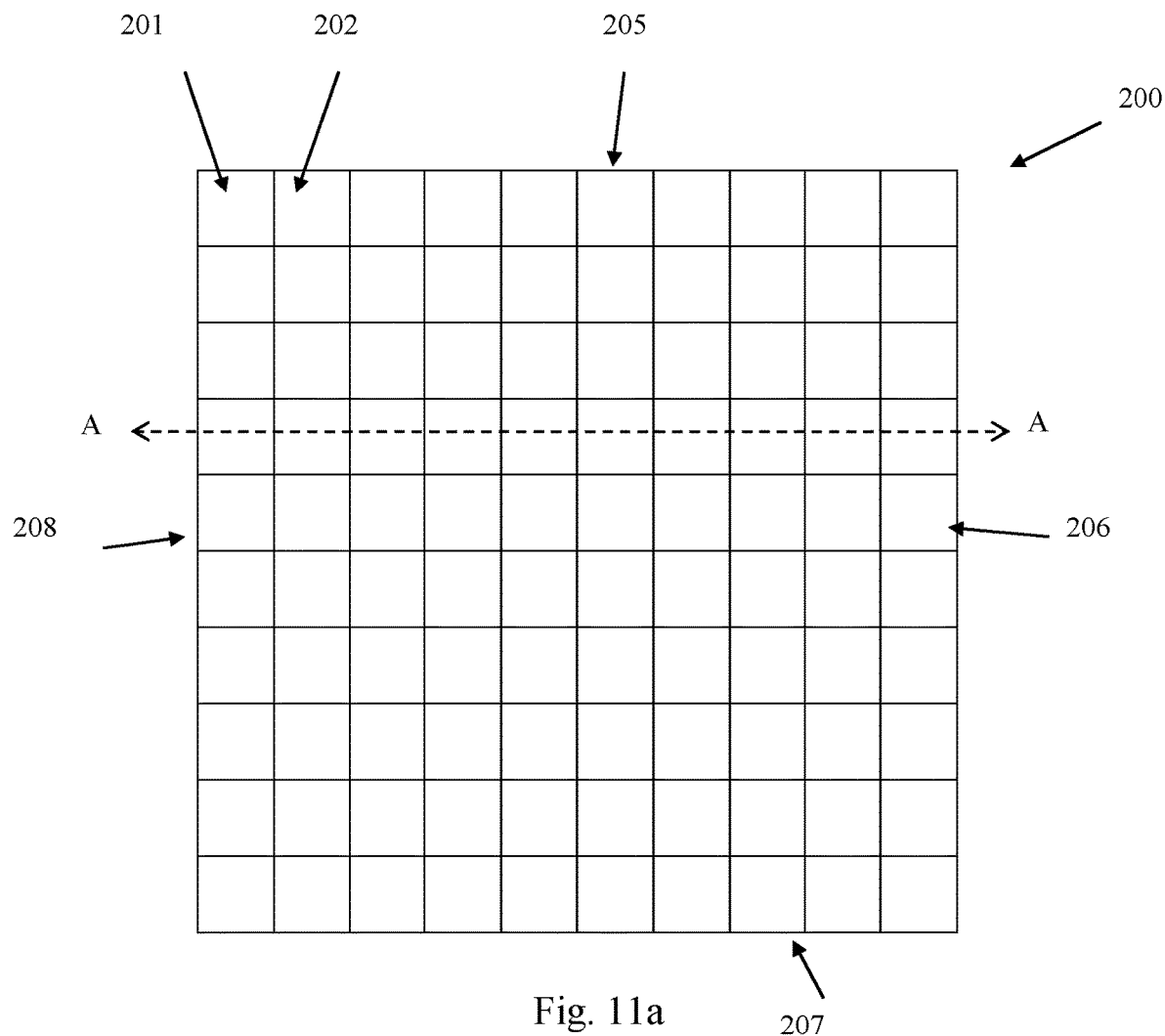
FIG. 11a is a plan view of a calibration artefact according to an embodiment of the invention.
Figure 11B:
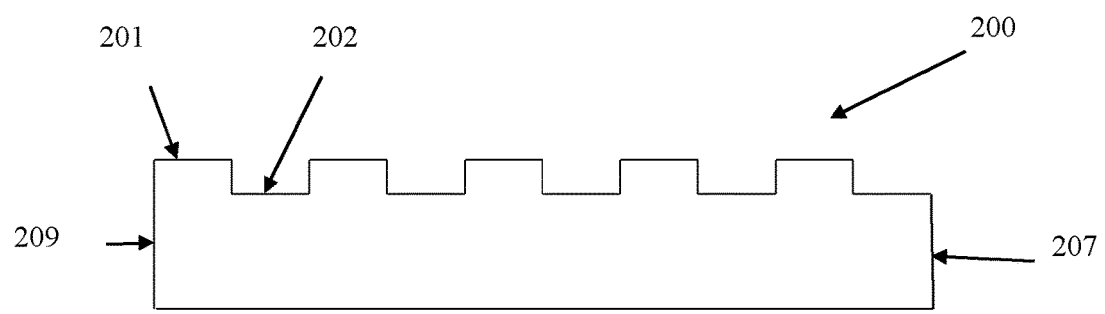
Figure 12:
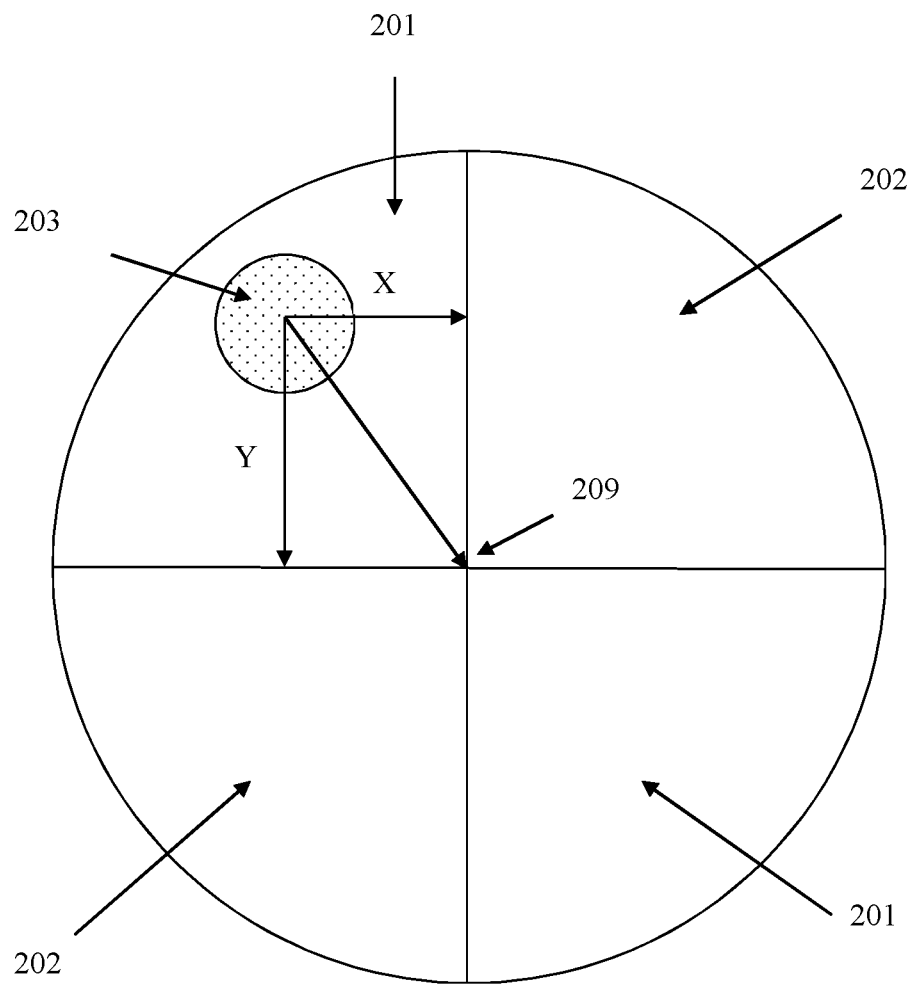
FIG. 12 is an image captured by the apparatus during a calibration procedure.

Before commencing a build, the optics of the optical module 106 are calibrated to ensure that the laser beam is directed towards the required position on the powder bed 104. To do this, a calibrated artefact, such as artefact 200 shown in FIGS. 11a and 11b, is located on the build platform 102. The calibrated artefact 200 comprises an Invar plate having a number of features that can be identified through image analysis, in this embodiment a checkerboard of high and low squares 201, 202 such that an edge of the each square can be detected through image analysis. The high and low squares are of known size, such as having a width of between 0.5 mm and 30 mm. The grid shown in FIG. 11a is for illustrative purposes only and, for practical use, the grid is likely to comprise a larger number of squares. The peripheral edges 205, 206, 207 and 208 of the calibrated artefact 200 are designed to be a perfect square The steerable optics 175 are moved such that a corner 209 at which four squares intersect is located at a centre of the image captured by camera 173, as shown in FIG. 12. Such an alignment can be determined through image analysis and detecting the edges of the squares 201, 202. The laser 105 is fired to generate a mark 203 on the artefact 200. An offset of a centre of the mark from an expected location is determined. This is carried out for a plurality of such locations on the artefact 200 to generate a map of offsets for different locations of the laser beam focus across the working area. From these offsets, an error map can be created for correcting movements of the laser beam focus.

However, the calibrated artefact 200 may not be aligned parallel to the sides of the build platform 102 and therefore, the error map may be skewed relative to the build platform 102. To correct for this skew, at least one of the cameras 190, 191 captures an image of the entire working area containing the calibrated artefact and computer 160 identifies peripheral edges 205, 206, 207 and 208 of the calibrated artefact and determines a translation that would align the artefact 200 to be parallel with the sides of the build platform 102. This translation is applied to the error map to correct for misalignment of the calibrated artefact 200 on the build platform 102.

The apparatus may also comprise a calibration artefact 300 that remains in a place in the apparatus 100 during the build. The calibration artefact may comprise features that can be used for correcting for drift of the laser beam from the offsets determined using calibrated artefact 200 during the build. For example, the laser beam may be focussed on the calibration artefact 300 between solidification of powder layers 104, such as when a new powder layer 104 is being spread by the wiper, to determine, using camera 173, whether the laser beam has drifted from its calibrated position during the build. This could be carried out in a similar manner to that described using calibration artefact 200, wherein a mark is made on the artefact 300 and the image captured by camera 173 is analysed to determine an offset of the mark from an identifiable feature of artefact 300.

Modifications and alterations can be made to the above described embodiment without departing from the scope of invention as defined herein. For example, the spectrometer may be replaced with one or more photodiodes capable of recording the intensity of light over a narrow band of wavelengths that includes characteristic peaks in the spectral emissions from the material used in the build. In this way, the analysis may comprise analysing the intensity of light recorded by the one or more photodiodes without having to extract the intensity of the peak from an entire spectrum.

The invention claimed is:

1. A laser solidification apparatus for building objects by layerwise solidification of powder material, the apparatus comprising a build chamber containing a build platform, a device for depositing layers of powder material on to the build platform, an optical unit for directing a laser beam to selectively solidify areas of each powder layer, the optical unit comprising tiltable mirrors for steering the laser beam onto the powder layer, movable focussing optics for focussing the laser beam on the powder layer, an actuator for driving movement of the movable focusing optics and a controller arranged to control movement of the focusing optics synchronously with movement of the tiltable mirrors to maintain the focus of the laser beam in the same plane as a deflection angle of the laser beam changes, a photodetector arranged for detecting characteristic radiation, generated by interaction of material in the layer with the or a further laser beam, the photodetector being arranged to detect the characteristic radiation that is collected by the tiltable mirrors and the movable focussing optics, a beam splitter arranged to reflect the laser beam and transmit the characteristic radiation, and a heat dump for capturing laser light that is transmitted through the beam splitter.

2. A laser solidification apparatus according to claim 1, wherein the actuator is arranged to move the focussing optics towards and away from each other in a linear direction.

3. A laser solidification apparatus according to claim 1, wherein the movable focussing optics comprises focussing lenses.

4. A laser solidification apparatus according to claim 1, wherein the actuator is a voice coil.

5. A laser solidification apparatus according to claim 1, comprising a spectrometer for detecting the characteristic radiation that is collected by the tiltable mirrors and movable focussing optics.

6. A laser solidification apparatus according to claim 1, wherein the photodetector is arranged to detect wavelengths within a wavelength band of 300 to 700 nm.

7. A laser solidification apparatus according to claim 1, comprising a bandpass filter for filtering light directed towards the photodetector.

8. A laser solidification apparatus according to claim 7, wherein the bandpass filter has a bandwidth of between 300 nm and 700 nm.

9. A laser solidification apparatus according to claim 7, wherein the bandpass filter is a mirror which directs light to the photodetector.

10. A laser solidification apparatus according to claim 1, wherein the photodetector is for spatially resolving a position of a feature generating the characteristic radiation in two-dimensions.

11. A laser solidification apparatus according to claim 10, wherein the photodetector comprises a camera.

12. A laser solidification apparatus according to claim 1, wherein the photodetector comprises at least one photodiode.

13. A laser solidification apparatus according to claim 12, wherein the photodetector comprises at least two photodiodes, each of the photodiodes for detecting characteristic radiation of a different band of wavelengths.

14. An optical unit directing a laser beam to selectively solidify areas of powder layers in a selective laser solidification apparatus, the optical unit comprising tiltable mirrors for steering the laser beam onto the powder layer, movable focussing optics for focussing the laser beam on the powder layer, an actuator for driving movement of the movable focusing optics and a controller arranged to control movement of the focusing optics synchronously with movement of the tiltable mirrors to maintain the focus of the laser beam in the same plane as a deflection angle of the laser beam changes, and a photodetector arranged for detecting characteristic radiation, generated by interaction of material in the layer with the or a further laser beam, the photodetector is arranged to detect the characteristic radiation that is collected by the tiltable mirrors and the movable focussing optics, a beam splitter arranged to reflect the laser beam and transmit the characteristic radiation, and a heat dump for capturing laser light that is transmitted through the beam splitter.

* * * * *